(12) United States Patent
Azami et al.

(10) Patent No.: US 7,633,487 B2
(45) Date of Patent: Dec. 15, 2009

(54) MULTICHANNEL INFORMATION PROCESSING DEVICE

(75) Inventors: Toshihiro Azami, Kawasaki (JP);
Katsutoshi Yano, Kawasaki (JP);
Tomoharu Matsushita, Kawasaki (JP);
Tomonori Yasumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 772 days.

(21) Appl. No.: 10/669,508

(22) Filed: Sep. 25, 2003

(65) Prior Publication Data
US 2004/0056885 A1    Mar. 25, 2004

Related U.S. Application Data

(63) Continuation of application No. PCT/JP01/02423, filed on Mar. 26, 2001.

(51) Int. Cl.
G09G 5/08    (2006.01)

(52) U.S. Cl. .................................. 345/157
(58) Field of Classification Search .......... 345/156, 345/157, 159, 160; 381/104, 107–109; 715/727–728, 715/855; 370/260
See application file for complete search history.

(56) References Cited

U.S. PATENT DOCUMENTS 5,237,418 A * 8/1993 Kaneko .................... 348/565
5,666,555 A * 9/1997 Okazaki et al. ............ 715/500.1
5,736,982 A * 4/1998 Suzuki et al. .............. 715/706
5,796,945 A * 8/1998 Tarabella .................. 709/219
6,081,266 A * 6/2000 Sciammarella ............. 715/727
6,118,493 A * 9/2000 Duhault et al. ............. 348/564
6,334,025 B1 * 12/2001 Yamagami ................ 386/96
6,469,712 B1 * 10/2002 Hilpert et al. .............. 715/727
6,590,618 B1 * 7/2003 Park et al. ................. 348/734

FOREIGN PATENT DOCUMENTS

| JP | 5-113864 | 5/1993 |
| JP | 06-110642 | 4/1994 |
| JP | 07-129356 | 5/1995 |
| JP | 08-292872 | 11/1996 |

* cited by examiner

Primary Examiner—Chanh Nguyen
Assistant Examiner—Calvin C Ma
(74) Attorney, Agent, or Firm—Staas & Halsey LLP

(57) ABSTRACT

A device is provided in which a video image controller acquires information for a plurality of video images from a video image source, a cursor position controller calculates cursor position information and generates cursor image information, a display image generator synthesizes the plurality of video images and cursor image information and displays the same on a display device, a distance information generator generates distance information based on the video image position information and the cursor position information, and an audio output controller decides volume of audio for the plurality of video images based on this distance information, and outputs to an audio output device.

18 Claims, 13 Drawing Sheets

| No. of displayed channels | n | | |
|---|---|---|---|
| Channel no. | Central position | Width | Height |
| CH1 | CX1,CY1 | W1 | H1 |
| ... | ... | ... | ... |
| CHn | CXn,Cyn | Wn | Hn |

| No. of displayed channels | n | | | | |
|---|---|---|---|---|---|
| Channel no. | Central position | Display width | Display height | Neighborhood width | Neighborhood height |
| CH1 | CX1,CY1 | DW1 | DH1 | NW1 | NH1 |
| ... | ... | ... | ... | ... | ... |
| CHn | CXn,Cyn | DWn | DHn | NWn | NHn |

*Fig. 6*

MULTICHANNEL INFORMATION PROCESSING DEVICE

This is a continuation of International Application PCT/JP01/02423, with an international filing date of Mar. 26, 2001.

TECHNICAL FIELD

The present invention relates to a multichannel information processing device capable of simultaneously displaying on a display device a plurality of video images accompanied by audio data; more specifically, it relates to a multichannel information processing device that enables a user to easily apprehend content of a video image specified from among a plurality of video images displayed on a display device, a multichannel information processing method, a program for a multichannel information processing method, and a computer-readable recording medium on which is stored such program.

BACKGROUND ART

As high-speed Internet access using such means as ADSL and cable modems becomes increasingly common, users at home have greater opportunity to download over the Internet video images, such as television programs. In addition, interfaces between digital cameras and personal computers (PCs) have become more common, and users now commonly download video images they themselves shot into their PCs for processing.

Further, as PC functions improve and hard disk capacity increases, large amounts of data can easily be stored on a hard disk, replayed and displayed; and an environment in which a plurality of video images are displayed on a display device can be easily accommodated. To present such two or more video information, it is possible to arrange two or more windows in arbitrary positions, and to display these video information simultaneously on a display, such as a CRT or a liquid crystal display.

When a plurality of video images are thus displayed, the audio data accompanying such video images is handled either by outputting none of the audio data or by synthesizing and outputting all the audio data at the same volume. When audio is not output, this audio data cannot be used for apprehending the content of a video image; as there is no audio to assist in apprehending the content of the video image, a user is forced to make a determination about video image content relying solely on the images displayed on the display device. When all the audio data is synthesized at the same volume, the various audio data interfere with each other, and are difficult to hear; it is also difficult to tell which audio belongs to which video image.

It is an object of the present invention to facilitate recognition of which audio data corresponds to which video image, and to enable a user to easily apprehend the content of video image being displayed.

DISCLOSURE OF THE INVENTION

The multichannel information processing device according to a first aspect of the present invention is a multichannel information processing device capable of simultaneously displaying a plurality of video images on a display device, such device including video images control means for acquiring information for a plurality of video images, and for deciding video image position information relating to display position on the display device for the plurality of video images and then outputting the plurality of video images based on such video image position information; cursor position control means for calculating cursor position information based on cursor instructions information input via an input device and generating cursor images based on cursor position information and outputting the same; display image generating means for synthesizing and displaying the plurality of video images output by video image display control means and cursor image information output by cursor position control means; distance information generating means for calculating distance between display positions of the various video images and cursor display position based on video image position information for the plurality of video images and cursor position information calculated by cursor position control means, and generating distance information; and audio output control means for deciding volume for audio corresponding to the plurality of video images based on distance information generated by distance information generating means, and for outputting audio data to an output device.

The multichannel information processing device according to a second aspect of the present invention is a multichannel information processing device according to the first aspect, wherein audio output control means sets volume for audio for the video image having the smallest distance value among the distance information generated by distance information generating means at a predetermined sound volume Va, and sets volume for audio for the other video images at predetermined sound volume Vb, which is lower than Va.

The multichannel information processing device according to a third aspect of the present invention is a multichannel information processing device according to the first aspect, wherein audio output control means sets volume for audio data for a plurality of video images so as to be in inverse proportion to distance values generated by distance information generating means.

The multichannel information processing device according to a fourth aspect of the present invention is a multichannel information processing device according to the first aspect, wherein distance information generated by distance information generating means includes direction information relating to direction of video image display position as seen from cursor display position, and audio output control means makes output to an audio output device based on distance information, so that audio for the plurality of video images is positioned in the sound image space formed by the audio output device.

The multichannel information processing device according to a fifth aspect of the present invention is a multichannel information processing device according to the first aspect, further including voice data recognition means for recognizing words included in audio for a plurality of video images and character information display means for converting words recognized by voice data recognition means into character data and displaying the same on a display device.

The multichannel information processing device according to a sixth aspect of the present invention is a multichannel information processing device according to the first aspect, including Internet connection means, web site search means for searching for related web sites on the Internet, using a word recognized by voice data recognition means as keyword, and web site display means for displaying on a display device a web site found by web site search means.

The multichannel information processing device according to a seventh aspect of the present invention is a multichannel information processing device according to the first aspect, further including video image selecting means for selecting, based on a prescribed algorithm, a specified video image from among a plurality of video images displayed on a display device, wherein audio output control means outputs to an audio output device audio data for the video image selected by video image selecting means.

The multichannel information processing device according to an eighth aspect of the present invention is a multichannel information processing device according to the seventh aspect, wherein video image selecting means switches to a different video image for selection whenever a prescribed length of time has passed.

The multichannel information processing method according to a ninth aspect of the present invention is a multichannel information processing method for displaying a plurality of video images simultaneously on a display device, including a step for deciding display position on display device for video images to be displayed on the display device, a step for outputting information for the plurality of video images based on decided display position, a step for accepting cursor instructions information input from an input device, a step for calculating cursor position information for displaying cursor based on cursor position information, a step for generating cursor image information based on cursor instructions information, a step for synthesizing information for the plurality of video images and cursor image information, generating a display image, and displaying the same on the display device, a step for calculating distance between display position of the plurality of video images and display position of a cursor and generating distance information, and a step for deciding volume for audio for the plurality of video images based on distance information and outputting to an audio output device.

The multichannel information processing method according to a tenth aspect of the present invention is a multichannel information processing method according to the ninth aspect, wherein volume for audio for the video image having the smallest distance value among the distance information generated for the plurality of video images is set at a predetermined sound volume Va, and volume for audio data for the other video images is set at predetermined sound volume Vb, which is lower than volume Va.

The multichannel information processing method according to an eleventh aspect of the present invention is a multichannel information processing method according to the ninth aspect, wherein volume for audio for a plurality of video images is set so as to be in inverse proportion to distance values within distance information.

The multichannel information processing method according to a twelfth aspect of the present invention is a multichannel information processing method according to the ninth aspect, further including a step for generating direction information relating to direction of display position of video images as seen from cursor display position, and a step for making output to an audio output device, so that audio data for the plurality of video images is positioned in the sound image space of the audio output device in accordance with distance information and direction information.

The multichannel information processing method according to a thirteenth aspect of the present invention is a multichannel information processing method according to the ninth aspect, further including a step for recognizing words included in audio for a plurality of video images and a step for converting voice-recognized words into character data and displaying the same on a display device.

The multichannel information processing method according to a fourteenth aspect of the present invention is a multichannel information processing method according to the thirteenth aspect, including a step for connecting to the Internet, a step for searching for related web sites on the Internet, using a voice-recognized word as keyword, and a step for displaying on a display device a found related web site.

The multichannel information processing method according to a fifteenth aspect of the present invention is a multichannel information processing method according to the ninth aspect, further including a step for selecting with a prescribed algorithm a specified video image from among a plurality of video images displayed on a display device, and a step for outputting to an audio output device audio data for a selected video image.

The program according to a sixteenth aspect of the present invention is a program for executing on a computer a multichannel information processing method for displaying a plurality of video images simultaneously on a display device, such method including a step for deciding display position for video images on a display device, a step for outputting information for the plurality of video images based on decided display position, a step for accepting cursor instructions information input from an input device, a step for calculating cursor position information for displaying cursor based on cursor instructions information, a step for generating cursor image information based on cursor position information, a step for synthesizing information for the plurality of video images and cursor image information, generating a display image, and displaying the same on the display device, a step for calculating distance between display position of the plurality of video images and display position of a cursor and generating distance information, and a step for deciding volume for audio for the plurality of video images based on distance information and outputting to an audio output device.

The program according to a seventeenth aspect of the present invention is a program for executing on a computer a multichannel information processing method for displaying a plurality of video images simultaneously on a display device, such method including a step for deciding display position for video images on a display device, a step for outputting information for the plurality of video images based on decided display position, a step for accepting cursor instructions information input from an input device, a step for calculating cursor position information for displaying cursor based on cursor instructions information, a step for generating cursor image information based on cursor position information, a step for synthesizing information for the plurality of video images and cursor image information, generating a display image, and displaying the same on the display device, a step for calculating distance between display position of a plurality of video images and display position of a cursor and generating distance information, and a step for setting volume for audio for the video image having the smallest distance value among the distance information generated with regards to the plurality of video images at a predetermined sound volume Va, and setting volume for audio for the other video images at predetermined sound volume Vb, which is lower than Va, and outputting to an audio output device.

The program according to an eighteenth aspect of the present invention is a program for executing on a computer a multichannel information processing method for displaying a plurality of video images simultaneously on a display device, such method including a step for deciding display device display position for video images on a display device, a step for outputting information for the plurality of video images based on decided display position, a step for accepting cursor instructions information input from an input device, a step for calculating cursor position information for displaying cursor based on cursor instructions information, a step for generating cursor image information based on cursor position information, a step for synthesizing information for the plurality of video images and cursor image information, generating a display image, and displaying the same on the display device, a step for calculating distance between display position of the plurality of video images and display position of a cursor and generating distance information, and a step for setting volume for audio for the plurality video images so as to be in inverse proportion to distance value in distance information, and outputting to an audio output device.

The program according to a nineteenth aspect of the present invention is a program for executing on a computer a multichannel information processing method for displaying a plurality of video images simultaneously on a display device, such method including a step for deciding display position for video images on a display device, a step for outputting information for the plurality of video images based on decided display position, a step for accepting cursor instructions information input from an input device, a step for calculating cursor position information for displaying cursor based on cursor instructions information, a step for generating cursor image information based on cursor position information, a step for synthesizing information for the plurality of video images and cursor image information, generating a display image, and displaying the same on the display device, a step for calculating distance between display position of the plurality of video images and display position of a cursor and generating distance information, a step for generating direction information relating to direction of display position for each video image as seen from cursor display position, and a step for outputting to an audio output device so that audio data for the plurality of video images have set acoustic image positions in accordance with distance information and direction information in the sound image space in an audio output device.

The program according to a twentieth aspect of the present invention is a program for executing on a computer a multichannel information processing method for displaying a plurality of video images simultaneously on a display device, such method including a step for deciding display position for video images on a display device, a step for outputting information for the plurality of video images based on decided display position, a step for accepting cursor instructions information input from an input device, a step for calculating cursor position information for displaying cursor based on cursor instructions information, a step for generating cursor image information based on cursor position information, a step for voice-recognizing words included in audio data for the plurality of video images, and a step for synthesizing the plurality of video images, cursor image information and character information, generating a display image and displaying the same on a display device.

The program according to a twenty-first aspect of the present invention is a program for executing on a computer a multichannel information processing method for displaying a plurality of video images simultaneously on a display device, such method including a step for deciding display position for video images to be displayed on a display device, a step for outputting information for the plurality of video images based on decided display position, a step for accepting cursor instructions information input from an input device, a step for calculating cursor position information for displaying cursor based on cursor position information, a step for generating cursor image information based on cursor position information, a step for calculating distance between position information for the plurality of video images and cursor position information and generating distance information, a step for selecting a specified video image from among the plurality of video images based on distance information and outputting audio data for this video image to an audio output device, a step for voice-recognizing words included in audio data for output to an audio output device, a step for converting recognized words into character information and outputting the same, and a step for synthesizing the plurality of video images, cursor image information and character information, generating a display image and outputting the same to a display device.

The program according to a twenty-second aspect of the present invention is a program for executing on a computer a multichannel information processing method for displaying a plurality of video images simultaneously on a display device, such method including a step for deciding display position for video images to be displayed on a display device, a step for outputting information for the plurality of video images based on decided display position, a step for accepting cursor instructions information input from an input device, a step for calculating cursor position information for displaying cursor based on cursor position information, a step for generating cursor image information based on cursor position information, a step for calculating distance between position information for the plurality of video images and cursor position information and generating distance information, a step for selecting a specified video image from among the plurality of video images based on distance information and outputting audio data for this video image to the audio output device, a step for voice-recognizing words included in audio data for output to the audio output device, a step for voice-recognizing words included in audio for the plurality of video images, a step for connecting to the Internet, a step for searching for related web sites on the Internet using a voice-recognized word as keyword, and a step for synthesizing the plurality of video images, cursor image information and a found web site, generating a display image and displaying the same on a display device.

The program according to a twenty-third aspect of the present invention is a program for executing on a computer a multichannel information processing method for displaying a plurality of video images simultaneously on a display device, such method including a step for deciding display position for video images to be displayed on a display device, a step for outputting information for the plurality of video images based on decided display position, a step for selecting with a prescribed algorithm a specified video image from among the plurality of video images displayed on a display device, and a step for outputting audio for the selected video image to an audio output device.

The recording medium according to a twenty-fourth aspect of the present invention is a computer-readable medium on which is recorded the programs of the sixteenth through twenty-third aspects.

A BRIEF EXPLANATION OF THE DRAWINGS

FIG. 6 shows another example of a video image position information table.

PREFERRED EMBODIMENTS

Basic Configuration

Figure 1:
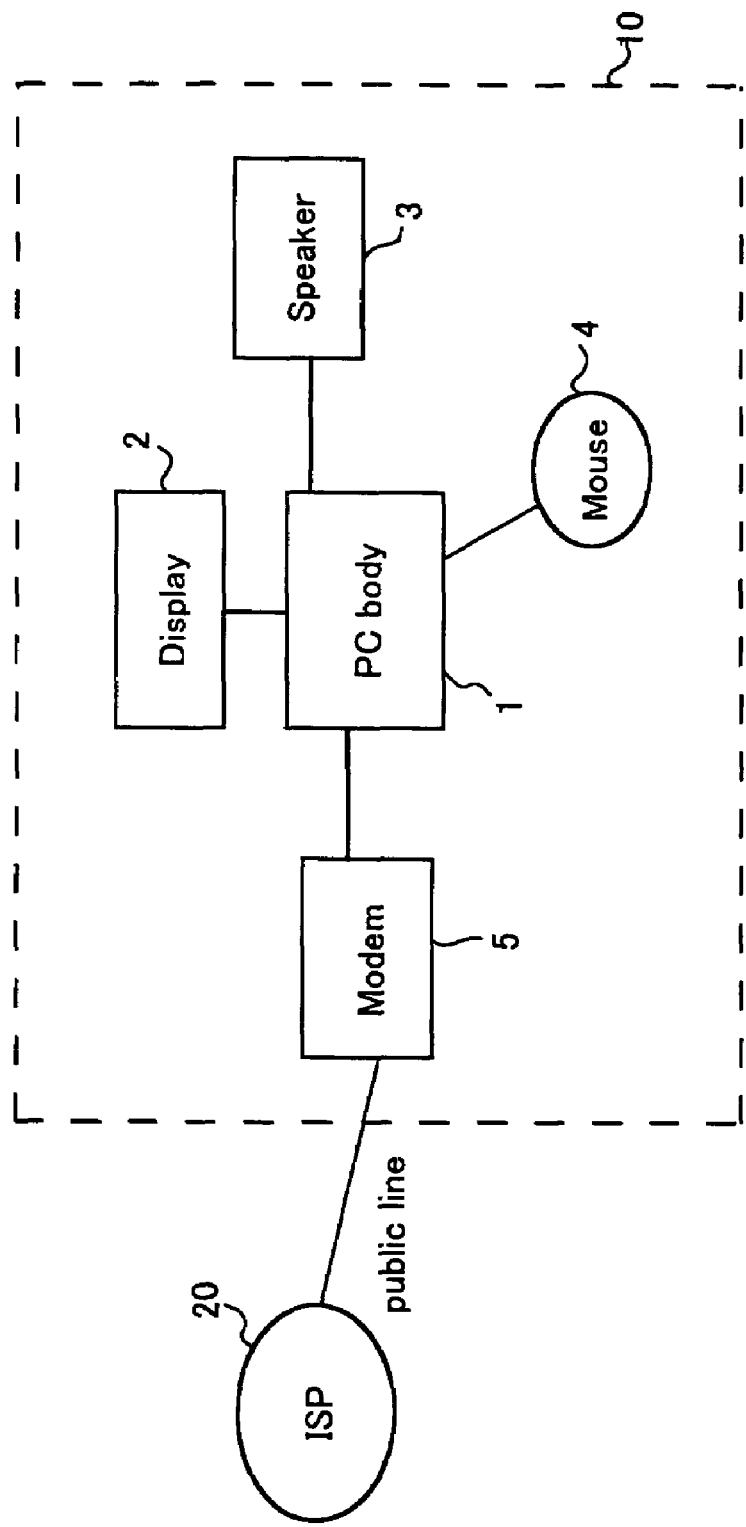
FIG. 1 is a block diagram showing a simplified configuration of the present invention.

FIG. 1 shows hardware configuration for an information processing device according to a first embodiment of the present invention.

An information processing device 10, which may be a standard personal computer, includes a PC body 1, a display 2, such as a cathode ray tube or liquid crystal display device, speaker 3, input device 4, such as a mouse, trackball, touchpad, or keyboard, and a modem 5 capable of connecting to the Internet. The modem 5 may be, for example, an ADSL modem, which connects to the Internet over public lines.

The PC body 1 is configured so as to allow connection to an ISP (Internet Service Provider) 20 using the modem 5 and a public phone line and download a plurality of video images information from streaming data available at the ISP 20. The downloaded plurality of video images are displayed on positions on the display 2 that have been programmed in advance. The PC body 1 may of course be configured so that a user sets display position using tools containing in a program.

Figures 2, 3:
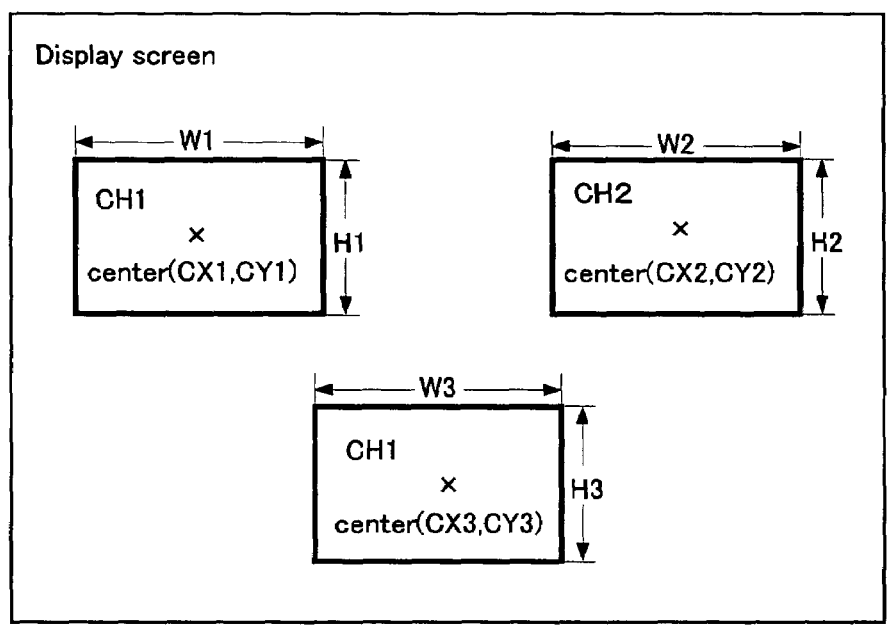
FIG. 2 shows an example of a video image position information table.
FIG. 3 shows an example of screen configuration.

FIG. 2 shows a position information table relating to video image display position.

This position information table has entries for channel number, center position, width, height, and the like; it contains information regarding center coordinates (CXi, CYi), width Wi and height Hi for video images from each channel number CHi (where i=1 to n). The position information table is set up for every (n) channels to be displayed, and is prepared for the maximum number of channels that the PC body 1 can process or the display 2 can display.

FIG. 3 shows an example of a screen displayed in a case where video images are displayed based on position information set according to such a position information table. In the example shown, there are three channels to be displayed; the display position of each video image is decided by their respective coordinates (CXi, CYi), width Wi and height Hi.

First Embodiment

Figure 4:
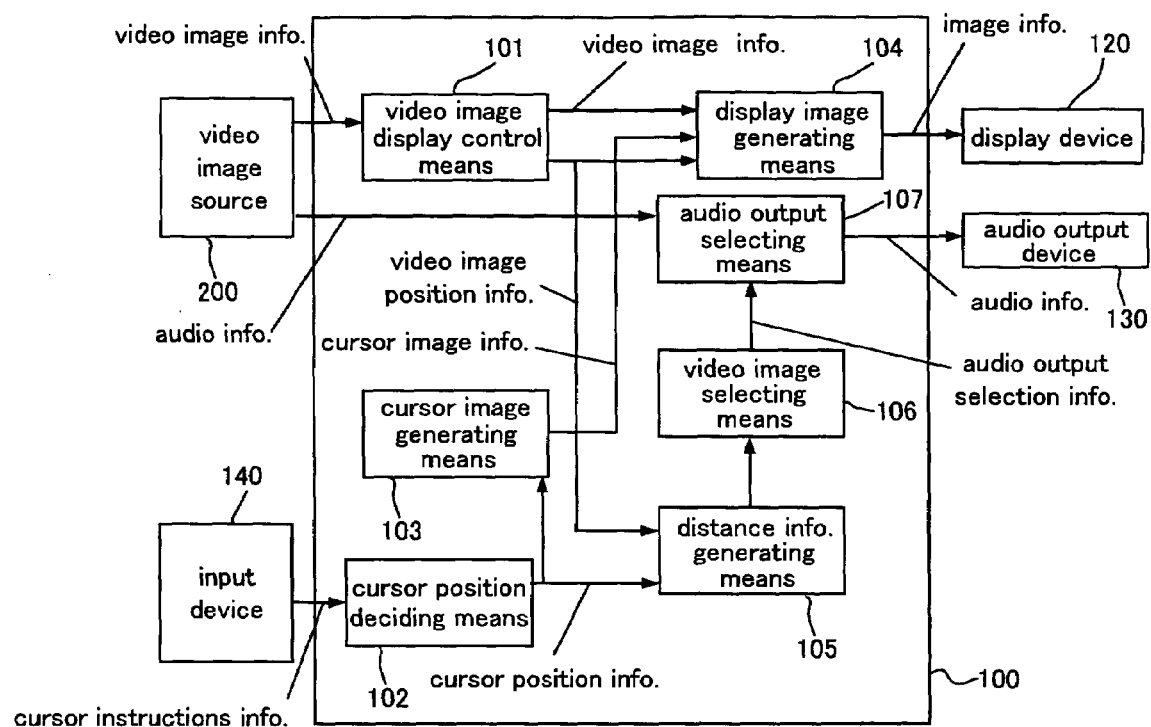
FIG. 4 is a control block diagram for a first embodiment.

FIG. 4 shows a control block diagram of a first embodiment of the present invention.

The information processing device 100 includes video image display control means 101 for acquiring a plurality of video images from a video image source 200. Video image display control means 101, for example, decides display position for each video image based on a position information table as shown in FIG. 2, and outputs this video image display position information and the video images.

A cursor position deciding means 102 accepts cursor instructions information from an input device 140, which may be a mouse, trackball, touchpad, keyboard or other pointing device, and it calculates information for next cursor position based on this cursor instructions information and current cursor position information, and outputs the same.

Cursor position information output from cursor position deciding means 102 is input into cursor image generating means 103. Cursor image generating means 103 generates cursor image information based on cursor position information, and outputs the same.

Video image information and video image position information output from video image display control means 101 and cursor image information output from generating means 103 are input into display image generating means 104. Display image generating means 104, which includes an image output buffer such as VRAM, arranges video images based on their respective position information, and synthesizes a cursor image, outputting this to a display device 120.

Video image position information output from video image display control means 101 and cursor position information output from cursor position deciding means 102 are input into distance information generating means 105. Distance information generating means 105 calculates distance between display position of each video image and cursor display position, based on video image position information and cursor position information. The distance between the center position of a video image and the center position of the cursor may be used as distance between a video image display position and cursor display position. In addition, distance can be set to be zero when a cursor is positioned within a video image window.

Distance information generated by distance information generating means 105 is input into video image selecting means 106. Video image selecting means 106 decides the video image for which audio will be output based on distance information generated by distance information generating means 105. For example, the video image having the smallest distance value among the distance information for video images can be selected.

Video image selecting means 106 outputs audio output selection information based on the selected video image to audio output selecting means 107. Audio output selecting means 107 selectively acquires audio data for the video image, as set according to audio output selection information, from among the plurality of video images from the video image source 200, and outputs this to an audio output device 130.

Figure 5:
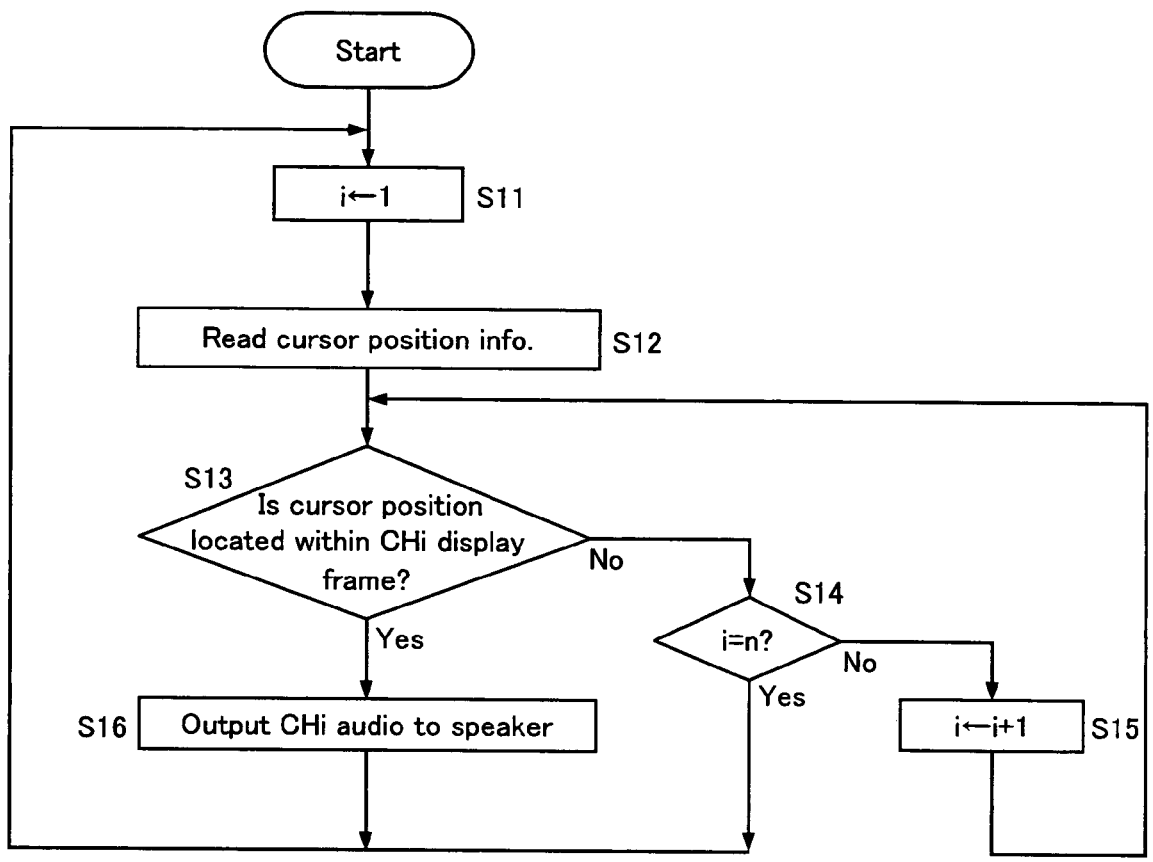
FIG. 5 is a control flowchart for the first embodiment.

Operations using this configuration will be explained based on the flowchart of FIG. 5.

In step S11, variable (i) is initialized. In step S12, cursor position information is read. In step S13, it is determined whether cursor display information is located within a video image display frame for channel number CHi. A video image position information table may include, in addition to entries for channel number, center position, display width and display height as shown in FIG. 6, entries for neighborhood width and neighborhood height. When a cursor display position is located within the range stipulated by center position coordinates (CXi, CYi) of video image of channel number CHi and neighborhood width NWi and neighborhood height NHi, it is determined to be within the display frame for the respective video image. In such a case, the display frame may be set within a range of a prescribed distance around a window displaying a video image, and when a cursor is located within such frame, determination is made that the respective video image has been selected. When it has been determined that a cursor display position is located within a display frame for a video image for channel number CHi, control proceeds to step S16.

In step S16, audio data for the video image of channel number CHi is output to the audio output device 130.

If, in step S13, it is determined that a cursor display position is not located within a display frame for a video image for channel number CHi, control proceeds to step S14.

In step S14, it is determined whether variable (i) has reached number of video images displayed (n). In case where variable (i) equals number of display channels n, control returns to step S11; in all other cases, control proceeds to step S15.

In step S15, variable (i) is incremented by 1 and control returns to step S13.

With such a configuration, even if the display position of a mouse cursor is not on a video image window, but is in the neighborhood of a window, the audio for the respective video image is output. Thus a user can use a pointing device such as mouse or trackball to move a cursor so that it approaches the window displaying the desired video image, allowing such user to hear the audio and thus easily apprehend the content of the video image.

Variation 1

Figure 7:
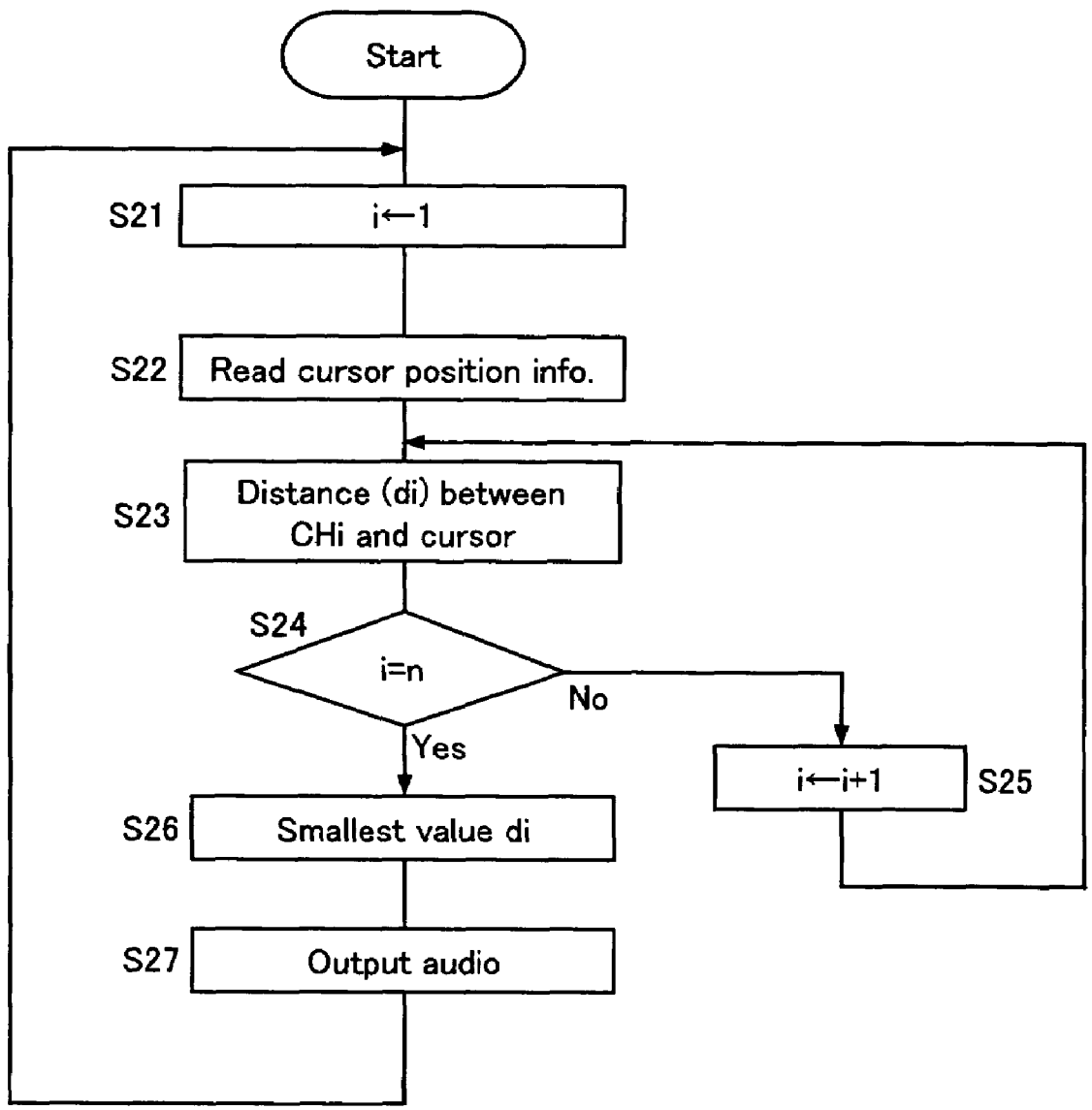
FIG. 7 is a control flowchart for a variation on the first embodiment

As an alternative configuration, the video image closest to cursor display position is selected for audio output. FIG. 7 shows a flowchart in such a case.

In step S21, variable (i) is initialized. In step S22, cursor position information is read. In step S23, distance (di) between cursor display position and display position for the video image of channel number CHi is calculated. This distance (di) may be the distance between the central coordinates of a window displaying a video image and the central coordinates of a cursor; alternatively, it may be the shortest distance between a frame of a window displaying a video image and the central coordinates of a cursor.

In step S24, it is determined whether variable (i) has reached number of video images being displayed (n). In case where variable (i) equals number of display channel (n), control proceeds to step S26; in all other cases, control proceeds to step S25.

In step S25, variable (i) is incremented by 1 and control proceeds to step S26.

In step S26, the smallest value (di) between a video image display position and a cursor display position is determined, and the video image for the relevant channel CHi is selected as a selected image.

In step S27, audio for the selected video image is output.

With such a configuration, there is no need to prepare a table for providing a display frame for the neighborhood of a window displaying a video image, as audio for the video image closest to the cursor display position is output.

Variation 2

An alternative configuration is, for example, to change the color of display window frame for a video image for which audio is being output, and to change the tone of video images not selected, allowing identification of which channel has been selected.

Variation 3

In another alternative configuration, audio data for each video image is amplified in inverse proportion to distance (di) between video image display position and cursor display position, synthesized and output.

Calculation of distance (di) between cursor display position central coordinates (CuX, CuY) and video image display position central coordinates (CXi, CYi) can be calculated according to the following formula:

$$di = ((CuX-CXi)^2 + (CuY-CYi)^2)^{1/2}.$$

Using this distance (di), the amplification rate CHig[dB] for audio data for the corresponding video image is set at: CHig[dB]=a*(di) (where a is an constant greater than 0).

With such a configuration, audio for a video image near cursor display position is output at high volume, and audio for a video image far from cursor display position is output at low volume. Accordingly, a user can use a mouse or other pointing device to increase the volume of audio for a video image approached by a cursor, allowing such user to apprehend the content of such video image; meanwhile, while audio volume for other video images is low, that audio is still being output, assisting a user in apprehending the content of the respective video images.

Variation 4

In yet another alternative configuration, direction information relating to direction of video image display position as seen from the cursor display position is calculated, and based on direction information and distance information, audio data for a video image is positioned in the sound space generated by the audio output device 130.

As described above, both cursor display position and video image display position can be expressed as display device coordinates; these coordinates can be used to calculate direction information for display position of a video image as seen from the cursor. Using such direction information and distance information (di), acoustic images for audio data can be assigned positions within the sound space generated by the audio output device 130. In such cases, however, the audio output device 130 must have at least 2 speakers, and the output from each speaker must be controlled so that a sound space is generated by the audio output from the speakers.

For example, for cursor central coordinates (CuX, CuY) and channel CHi central coordinates (CXi, CYi), x-axis direction CXid is calculated according to the following formula:

$$CXid = CuX - CXi.$$

Using this x-axis direction CXid, volume for left and right speakers is decided and audio output accordingly, and it is possible to orientate acoustic image.

With such a configuration, the display position of a video image on the display device 120 and the position of audio output from the audio output device 130 can be made to match, facilitating apprehension of video image content.

Second Embodiment

Figure 8:
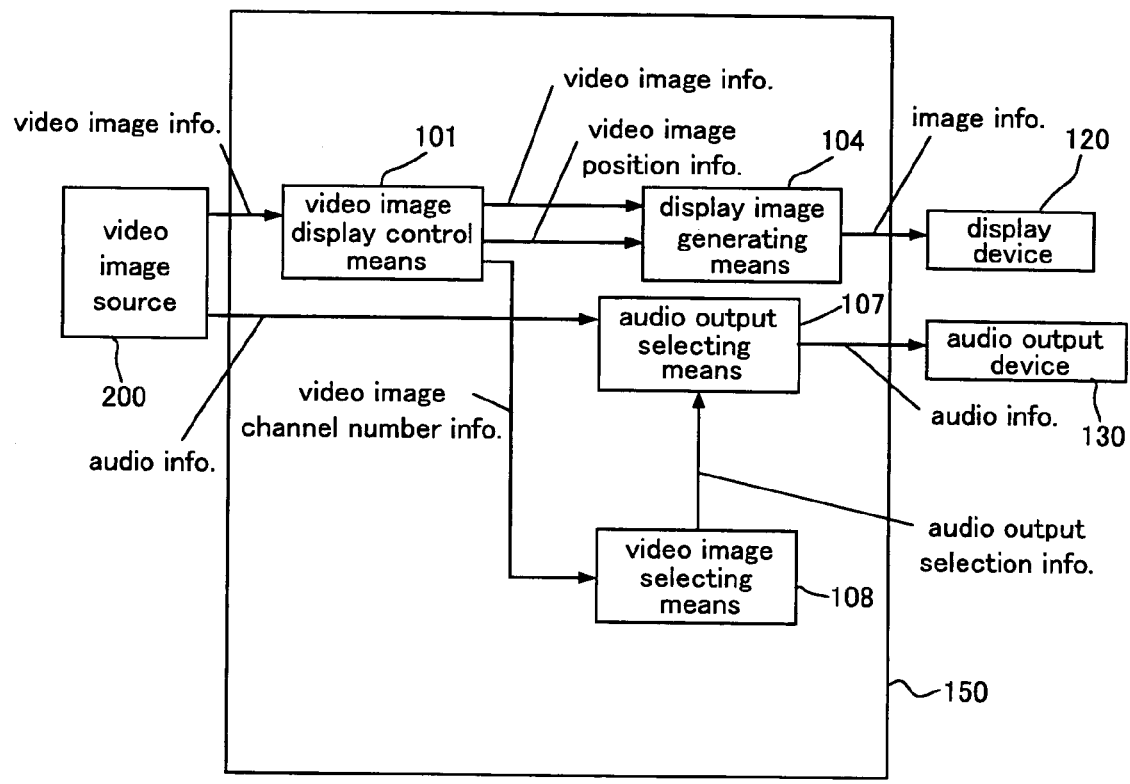
FIG. 8 is a control block diagram for a second embodiment.

FIG. 8 is a control block diagram of a second embodiment of the present invention.

The information processing device 150 includes video image display control means 101 for acquiring information for a plurality of video images from a video image source 200. As in the first embodiment, this video image display control means 101 decides display position for each video image in accordance with a preset position information table, and outputs this video image position information and video image information.

As in the first embodiment, display image generating means 104, which includes an image output buffer such as VRAM, arranges a plurality of video images based on their respective position information and outputs the images.

Video image position information from the video image display control means 101 is input into video image selecting means 108. Video image selecting means 108 has an algorithm for selecting video image information from a plurality of channels at predetermined periods. For example, one channel number is selected and audio selection information for selection of audio for the corresponding video image is output; whenever a certain amount of time has elapsed, the channel number selected switches according to channel number order.

Audio output selection information output from video image selecting means 108 is input into audio output selecting means 107. Based on audio output selection information, audio output selecting means 107 outputs to the audio output device 130 audio data for a video image of a selected channel.

Figure 9:
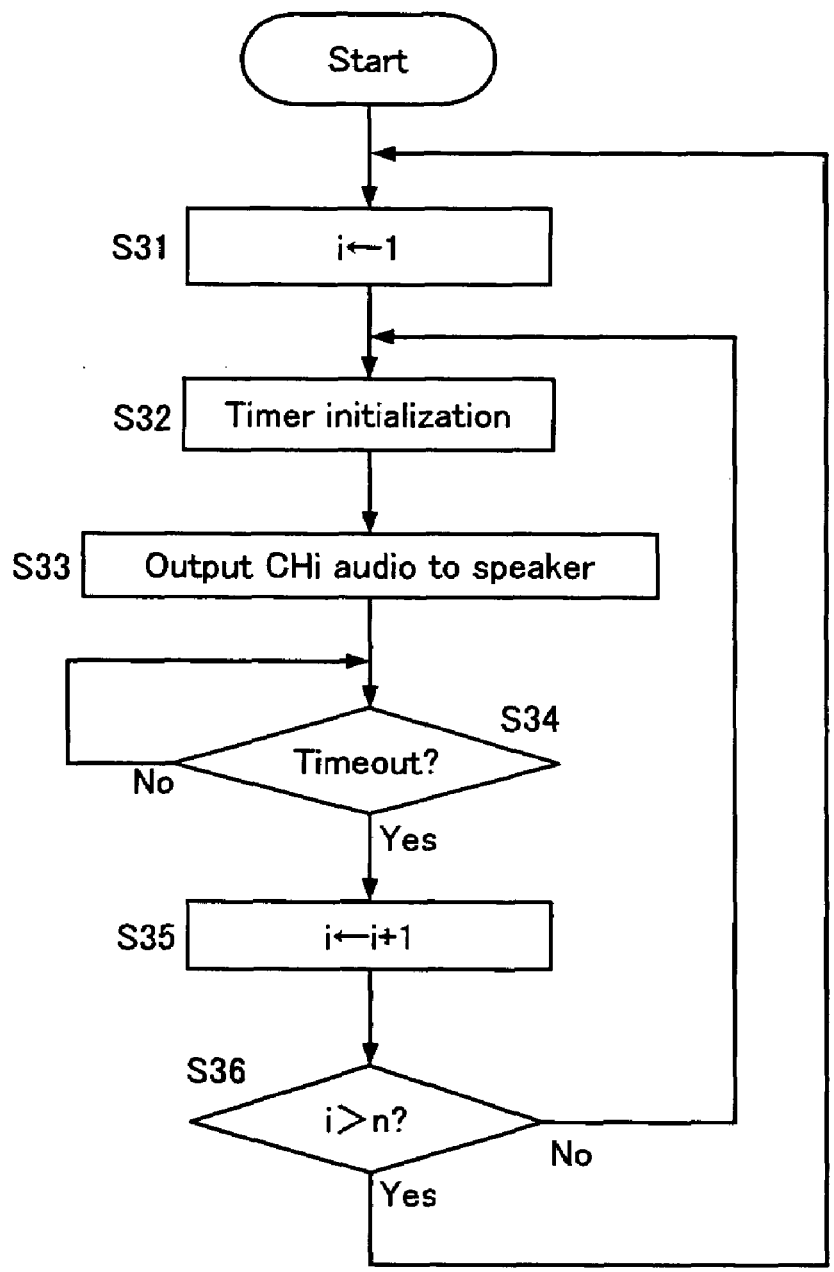
FIG. 9 is a control flowchart for a variation on the second embodiment

FIG. 9 shows a flowchart for an algorithm configured so that video images displayed are selected in order, and the audio data for a selected video image is output for a set length of time.

In step S31, variable (i) is initialized. In step S32, a timer is initialized and begins counting elapsed time. This timer times output of audio for the video image of a selected channel.

In step S33, audio data for the video image of channel CHi is output to the audio output device 130.

In step S34, it is determined whether timer count value has reached a predetermined value. If it is determined that the timer count value has reached a predetermined value, control proceeds to step S35.

In step S35, variable (i) is incremented by 1, and the video image for the next channel number is selected.

In step S36, it is determined whether the value of variable (i) has exceeded number of channels being displayed (n). If it is determined that the value of variable (i) has not exceeded number of channels (n), control returns to step S32; if it is determined that the value of variable (i) has exceeded number of channels (n), control returns to step S31.

With a configuration in which video image selecting means 108 selects video image in accordance with such an algorithm and audio for such selected video image is output, video image selected is periodically switched, and the audio for the respective video image is output for a set period of time. Without having to designate video image with a pointing device or the like, a user can periodically hear the audio for each video image, facilitating apprehension of the content of the video images.

Third Embodiment

Figure 10:
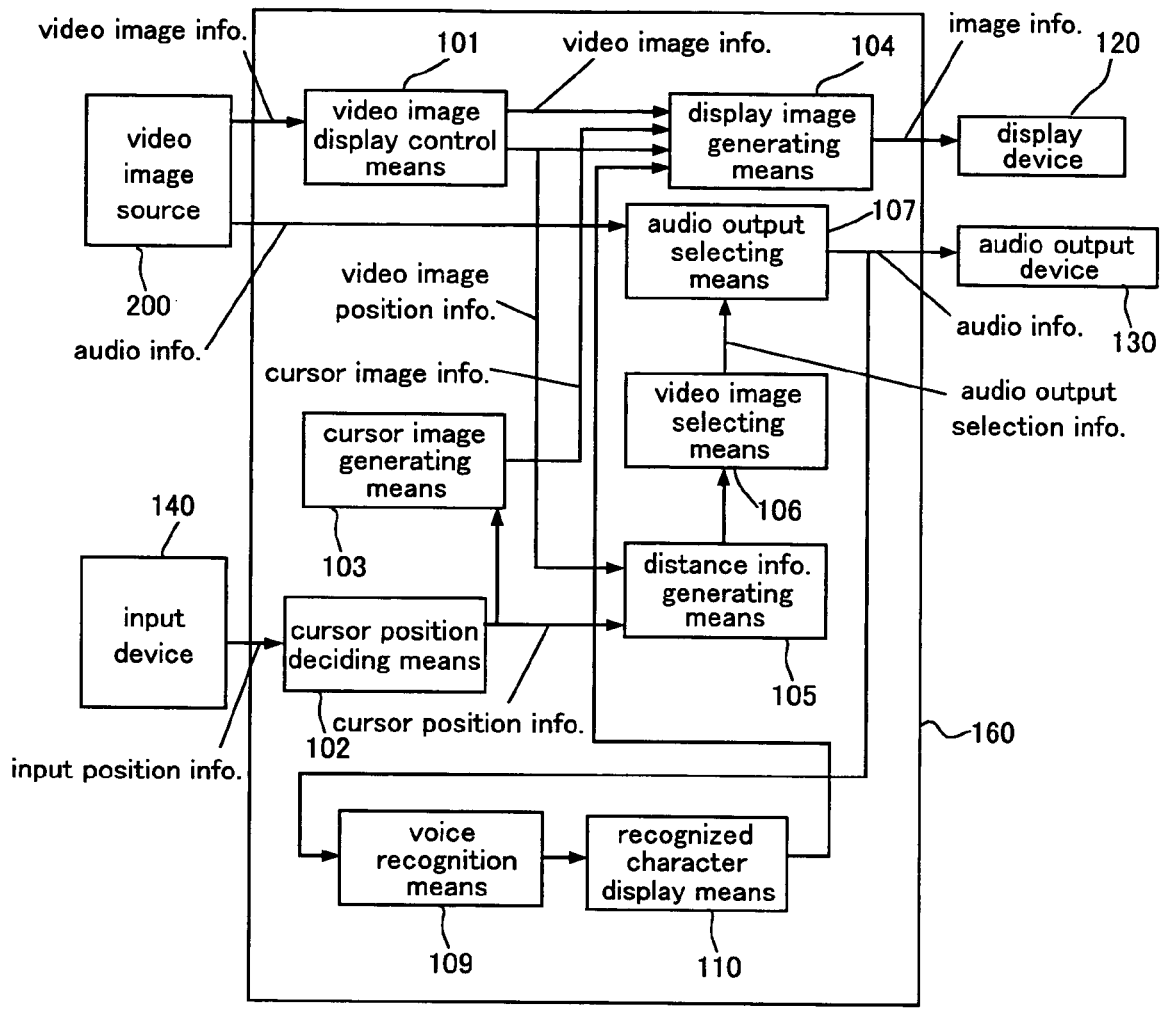
FIG. 10 is a control block diagram for a third embodiment.

FIG. 10 is a control block diagram for a third embodiment of the present invention.

This information processing device 160 includes video image display control means 101 for acquiring information for a plurality of video images from the video image source 200. As in the first embodiment, video image display control means 101 decides display position for each video image and outputs this video image position information and the video image itself.

Cursor position deciding means 102 receives cursor instructions information input from the input device 140, which may be a mouse, trackball, touchpad, keyboard or other pointing device, calculates next cursor position information based on these cursor instructions information and current cursor display position, and outputs the same.

Cursor position information output from cursor position deciding means 102 is input into cursor image generating means 103. Cursor image generating means 103 generates cursor image information based on cursor position information, and outputs the same.

Video image position information output from video image display control means 101 and cursor position information output from cursor position deciding means 102 are input into distance information generating means 105. Distance information generating means 105 calculates distance between each video image display position and cursor display position based on video image position information and cursor position information. The distance between the center position of a video image and the center position of the cursor may be used as distance between a video image display position and cursor display position. In addition, distance can be set to zero when a cursor is positioned within a video image window.

Distance information generated by distance information generating means 105 is input into video image selecting means 106. Video image selecting means 106 decides the video image for which audio will be output based on distance information generated by distance information generating means 105. For example, the video image having the smallest distance value among the distance information for video images can be selected.

Video image selecting means 106 outputs audio output selection information based on the selected video image to audio output selecting means 107. Audio output selecting means 107 selectively acquires audio data for the video image, as set according to audio output selection information, from among the plurality of video images from the video image source 200, and outputs this to the audio output device 130.

Audio data output from audio output selecting means 107 is input into voice recognition means 109. Voice recognition means 109 recognizes and extracts words having meaning from the audio data, and converts these to text information.

Text information converted by voice recognition means 109 is input into recognized character display means 110. Recognized character display means 110 generates character data for display on the display device 120 based on character information output from voice recognition means 109 and outputs the same to display image generating means 104.

Video image information and video image position information output from video image display control means 101, cursor image information output from cursor image generating means 103, and character data output from recognized character display means 110 are input into display image generation means 104. Display image generation means 104, which includes an image output buffer such as VRAM, arranges the plurality of video images based on their respective position information, synthesizes cursor image and character data, and outputs the same to the display device 120.

The character data output from recognized character display means 110 can be configured so as to be displayed in the neighborhood of the corresponding video image, and may also be configured so that information stating which video image the character data comes from is displayed on the display device 120.

In an alternative configuration, character data acquired from audio data for the video image of a selected channel is displayed, but audio is not output from the audio output device 130.

Figure 11:
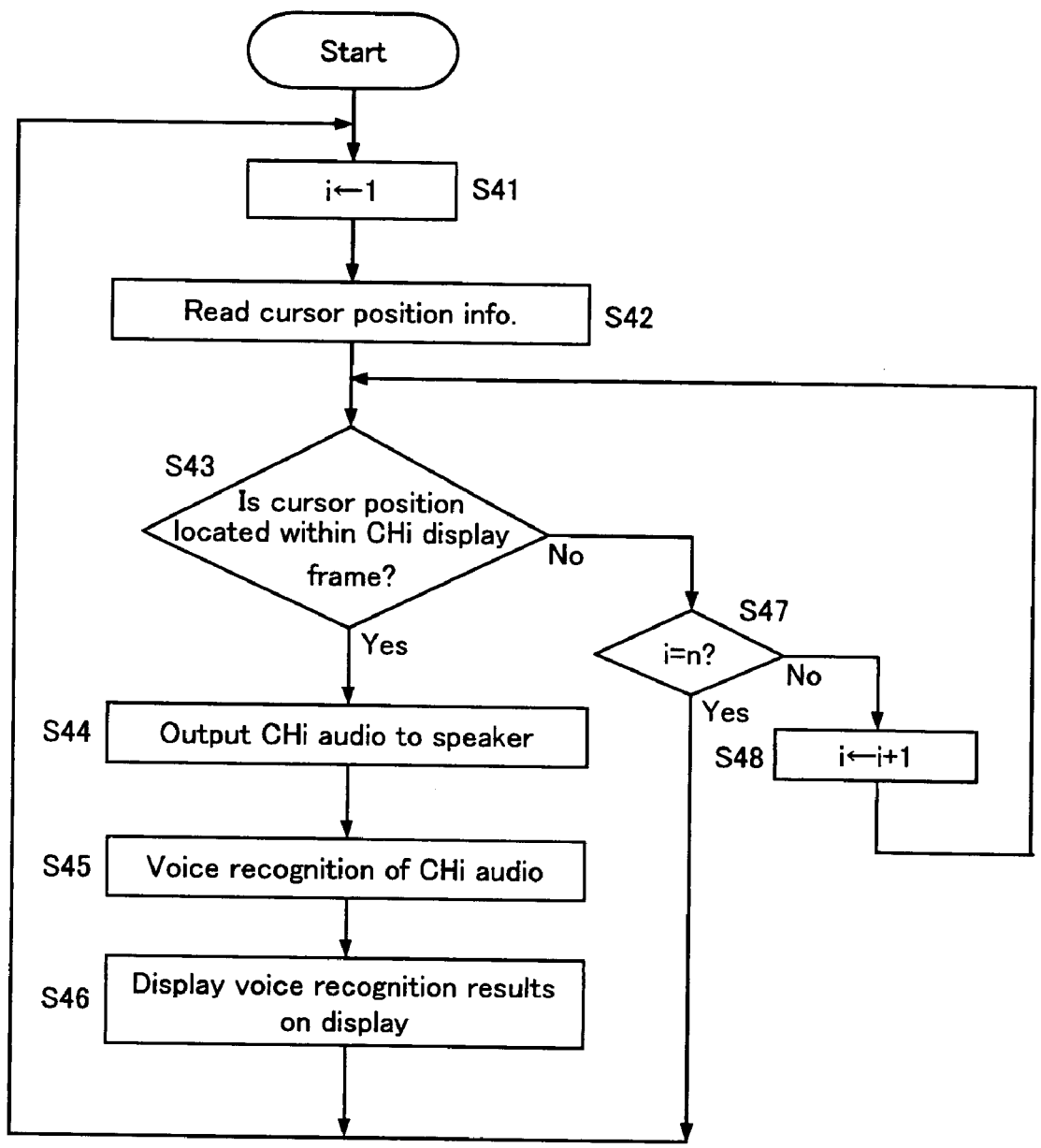
FIG. 11 is a control flowchart for the third embodiment.

Operations in such a case will be explained with reference made to the flowchart of FIG. 11.

In step S41, variable (i) is initialized. In step S42, cursor position information is read. In step S43, it is determined whether or not cursor display position is located within the display frame for video image of channel number CHi. In this case, as in the first embodiment, display frame may be set as the range defined by a predetermined distance around a window in which a video image is being displayed; when a cursor is located within such a display frame, determination is made that the relevant video image has been selected. In the case where it is determined that a cursor display position is located within the display frame for video image of channel Chi, control proceeds to step S44.

In step S44, audio data for the video image of channel number CHi is output to the audio output device 130.

In step S45, words having meaning in audio data for the video image of channel number CHi are recognized and converted into character data.

In step S46, recognized character data is sent to display image generation means 104 and displayed on the display device 120.

If in step S43 it is determined that cursor display position is not located within a display frame of the video image for channel number CHi, control proceeds to step S47.

In step S47, it is determined whether the value of variable (i) has reached number of channels being displayed (n). If it is determined that the value of variable (i) is equal to number of channels n, control returns to step S41; in all other cases, control proceeds to step S48.

In step S48, the variable (i) is incremented by 1, and then control returns to step S43.

Such a configuration enables visual recognition of words included in audio data for the video image of a selected channel, facilitating apprehension of the contents of the video image.

Variation

Figure 12:
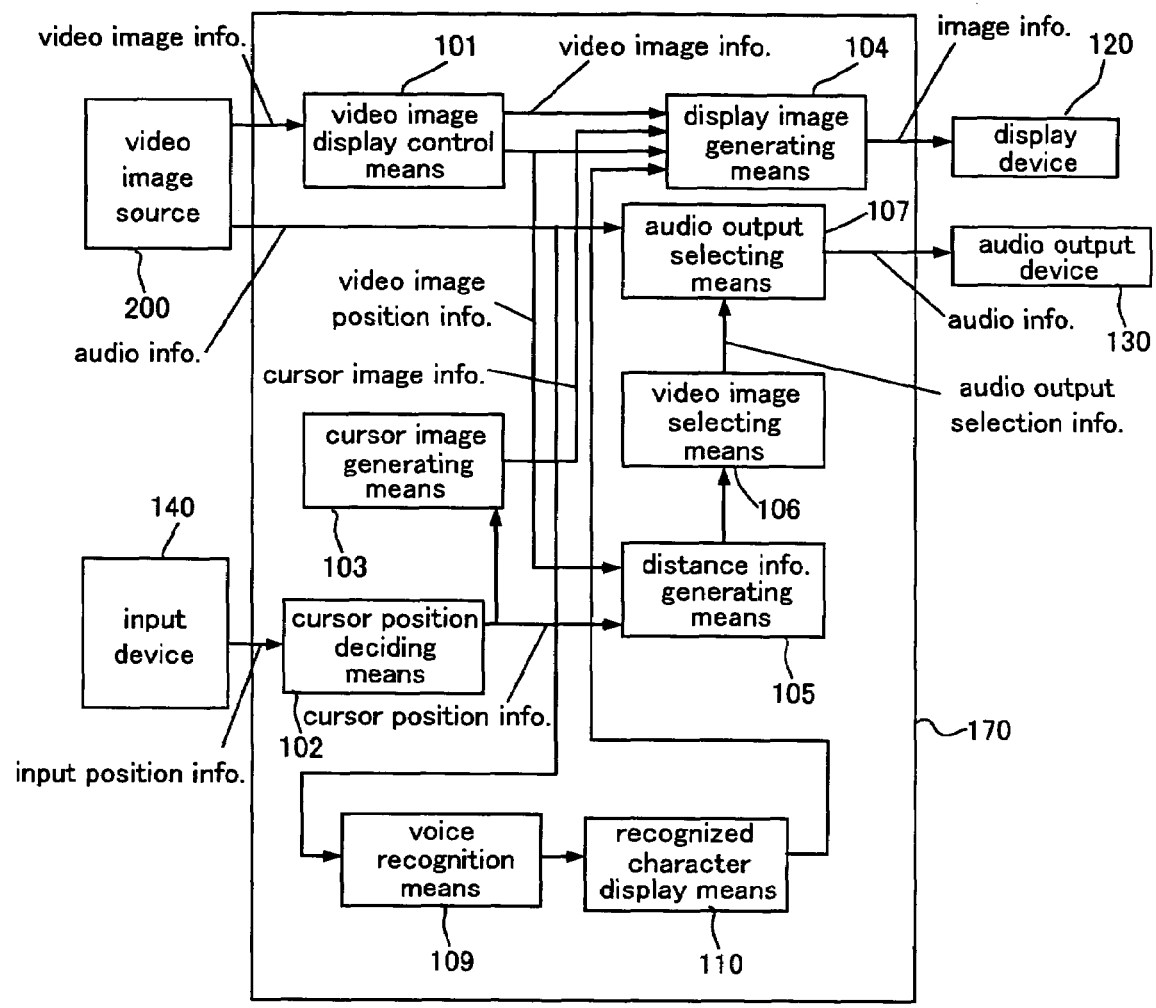
FIG. 12 is a control flowchart for a variation on the third embodiment

FIG. 12 is a block diagram of a variation on the third embodiment.

This information processing device 170 is provided with voice recognition means 109 and recognized character display means 110 in the same number as the number of channels to be displayed; words with meaning are extracted from the audio data for the video image in each respective channel, converted to character data, input into display image generation means 104 and displayed on the display device 120.

The character data may be displayed in the neighborhood of the display position of the corresponding video image, or the character data alone may be displayed on a list.

With such a configuration, words extracted from audio data for each video image are displayed on the display device 120, facilitating a user's apprehension of the content of each video image.

Fourth Embodiment

Figure 13:
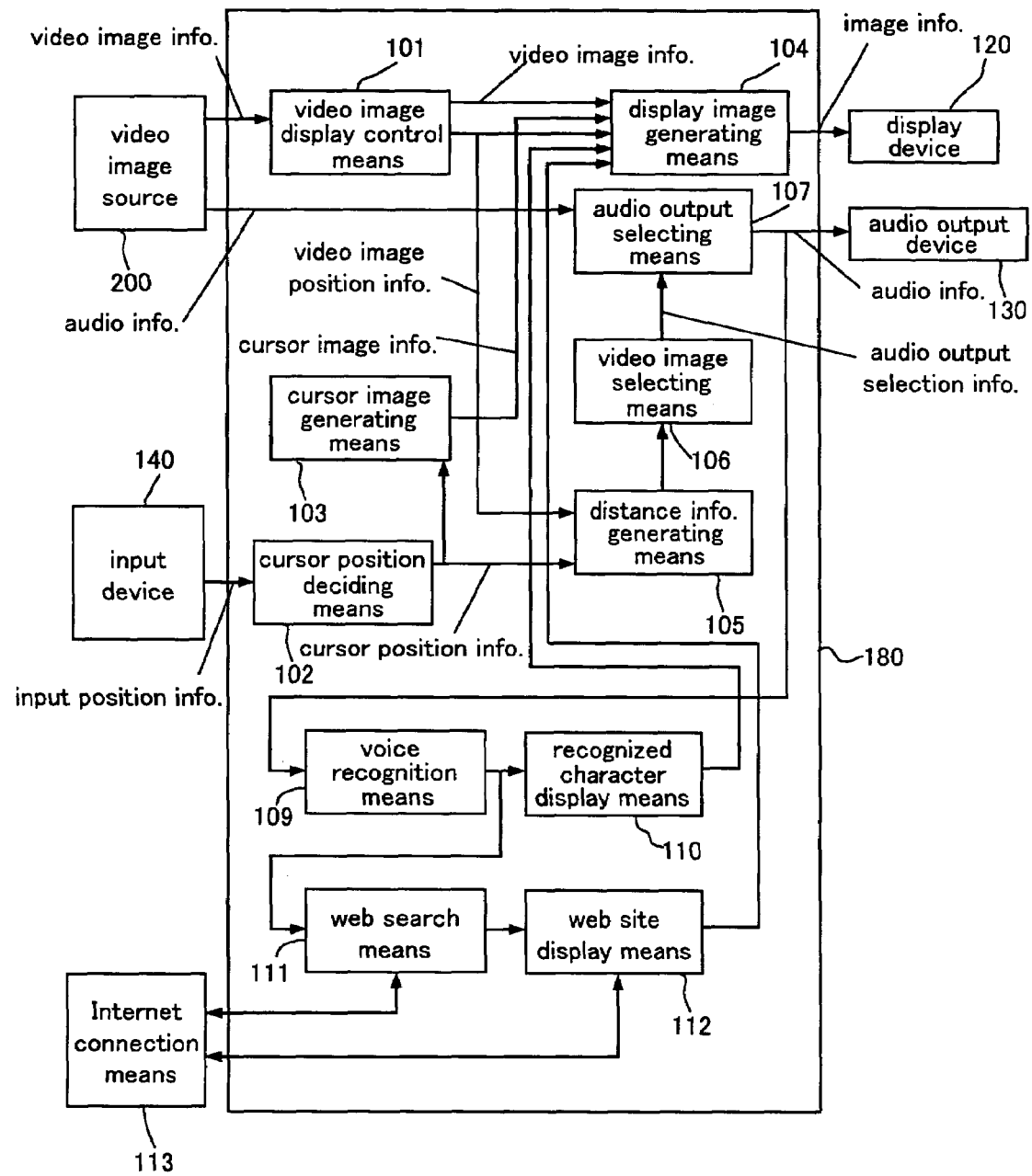
FIG. 13 is a control block diagram for a fourth embodiment.

FIG. 13 is a control block diagram of a fourth embodiment of the present invention.

This information processing device 180 includes video image display control means 101 for acquiring information for a plurality of video images from the video image source 200. As in the first embodiment, video image display control means 101 decides display position for each video image, and outputs this video image position information and video image information.

Cursor position deciding means 102 accepts cursor instructions input from an input device 140, which may be a mouse, trackball, touchpad, keyboard or other pointing device, and it calculates information for next cursor position based on this cursor position information and current cursor instructions input, and outputs the same.

Cursor position information output from cursor position deciding means 102 is input into cursor image generating means 103. Cursor image generating means 103 generates cursor image information based on cursor position information, and outputs the same.

Video image position information output from video image display control means 101 and cursor position information output from cursor position deciding means 102 are input into distance information generating means 105. Distance information generating means 105 calculates distance between display position of each video image and cursor display position, based on video image position information and cursor position information. The distance between the center position of a video image and the center position of the cursor may be used as distance between a video image display position and cursor display position. In addition, distance can be set to be zero when a cursor is positioned within a video image window.

Distance information generated by distance information generating means 105 is input into video image selecting means 106. Video image selecting means 106 decides the video image for which audio will be output based on distance information generated by distance information generating means 105. For example, the video image having the smallest distance value among the distance information for video images can be selected.

The video image selecting means 106 outputs audio output selection information based on the selected video image to audio output selecting means 107. Audio output selecting means 107 selectively acquires audio data for the video image, as set according to audio output selection information, from among the plurality of video images from the video image source 200, and outputs this to the audio output device 130.

Audio data output from audio output selecting means 107 is input into voice recognition means 109. Voice recognition means 109 recognizes, extracts, and converts into character information words with meaning in input audio.

Text information converted by voice recognition means 109 is input into recognized character display means 110. Recognized character display means 110 generates character data to be displayed on the display device 120 based on character information input from voice recognition means 109 and outputs the same to display image generating means 104.

Text information output from voice recognition means 109 is input into web search means 111. Web search means 111 accesses the Internet via Internet connection means 113, and searches for searchable web sites on the Internet using character information acquired from voice recognition means 109 as keywords. For web site searching, connection may be made to a search engine site such as Yahoo, Goo or Google, and search results received therefrom. Search results are received by web search means 111 via Internet connection means 113 and sent to web site display means 112.

Web site display means 112 accesses the URL of a web site obtained from the search results, acquires information from the web site and outputs the same to display image generating means 104. Web site display means 112 may be a browser such as Internet Explorer or Netscape Navigator. Web site information may also be acquired by accessing the Internet using Internet connection means 113.

Video image information and video image position information output from video image display control means 101, cursor image information output from cursor image generating means 103, character data output from recognized character display means 110, and web site information output from web site display means 112 are input into display image generating means 104. Display image generating means 104, which includes an image output buffer such as VRAM, arranges the plurality of video images based on their respective position information, synthesizes cursor image, character data and web site information, and outputs the same to the display device 120.

Figure 14:
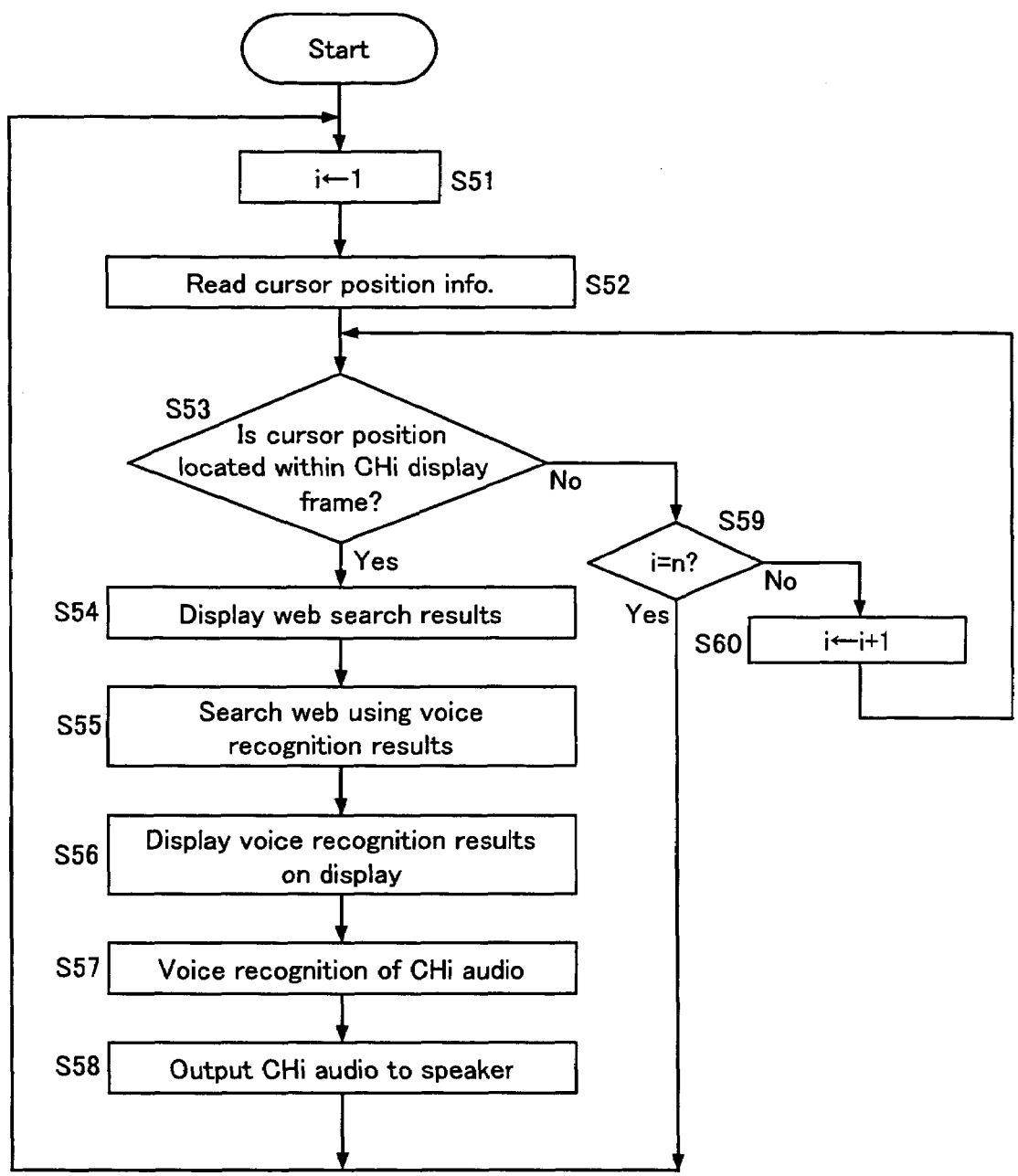
FIG. 14 is a control flowchart for the fourth embodiment.

The operations for such a configuration will be explained with reference made to the flowchart of FIG. 14.

In step S51, variable (i) is initialized. In step S52, cursor position information is read. In step S53, it is determined whether or not cursor display position is located within the display frame for video image of channel number CHi. In this case, as in the first embodiment, display frame may be set as the range defined by a predetermined distance around a window in which a video image is being displayed; when a cursor is located within such a display frame, determination is made that the relevant video image has been selected. When determination is made that cursor display position is located within the display frame for the video image of channel number CHi, control proceeds to step S54.

In step S54, audio data for the video image of channel number CHi is output to the audio output device 130.

In step S55, words having meaning in audio data for the video image of channel number CHi are recognized and converted into character data.

In step S56, recognized character data is sent to display image generating means 104 and displayed on the display device 120.

In step S57, a web search is carried out using character data obtained through voice recognition.

In step S58, web site information is acquired based on results of the web search and displayed on the display device 120.

If, in step S53, it is determined that cursor display position is not located within a display frame of the video image for channel number CHi, control proceeds to step S59.

In step S59, it is determined whether the value of variable (i) has reached number of channels being displayed (n). If it is determined that the value of variable (i) is equal to number of channels n, control returns to step S51; in all other cases, control proceeds to step S60.

In step S60, the variable (i) is incremented by 1, and then control returns to step S53.

With such a configuration, words obtained from audio data for a video image are used to acquire information from related web sites, which is displayed on a display device. This facilitates acquisition of information relating to each video image and simplifies acquisition of a variety of data.

INDUSTRIAL APPLICABILITY

In accordance with the present invention, the audio data corresponding to a specific video image from among a plurality of video images being displayed on a display device can be easily identified, facilitating a user's apprehension of the contents of that video image.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

The invention claimed is:

1. A multichannel information processing device wherein a plurality of video images are displayed simultaneously on a display device, comprising:
    video image information control means for acquiring information for the plurality of video images, and for deciding video image position information relating to display position on a display device for the plurality of video images and outputting the information for a plurality of video images based on the video image position information;
    cursor position control means for calculating cursor position information of a displayed cursor based on cursor instructions information input via an input device and generating and outputting cursor image information based on the cursor position information;
    display image generating means for synthesizing information for the plurality of video images output by the video image display control means and cursor image information output by cursor position control means and displaying the same on said display device;
    distance information generating means for calculating respective distances between each of the display positions of the plurality of video images and a cursor display position based on each center position information of the plurality of video images and center position information of the displayed cursor, and generating respective distance information; and
    audio output control means for deciding respective volumes of audio data for the plurality of video images displayed simultaneously on the display device based on each distance information generated by the distance information generating means, and simultaneously outputting respective audio data to an output device,
    wherein the audio output control means sets respective volumes of the audio data corresponding to the plurality of video images to one of multiple values so as to be in inverse proportion to the respective distances generated by said distance information generating means, synthesizes the audio data corresponding to the plurality of video images displayed by the display image generating means, using the respective volumes, and outputs the synthesized audio data.

2. A multichannel information processing device according to claim 1, wherein distance information generating means includes x-axis direction information relating to direction of video image display position as seen from cursor display position based upon an x-coordinate of central coordinates of the center position information of the video images and an x-coordinate of central coordinates of the center position information of the displayed cursor, and said audio output control means makes output to two speakers based on said x-axis direction information, so that audio data for said plurality of video images is positioned in the sound space formed by said two speakers.

3. A multichannel information processing device according to claim 1, further comprising:
    voice data recognition means for recognizing words included in audio data for said plurality of video images, and
    character information display means for converting words recognized by said voice data recognition means into character data and displaying the same on said display device.

4. A multichannel information processing device according to claim 3, comprising:
    Internet connection means,
    web site search means for searching for related web sites on the Internet, using a word recognized by said voice data recognition means as keyword; and
    web site display means for displaying on said display device a web site found by said web site search means.

5. A multichannel information processing device according to claim 1, further including video image selecting means for selecting, based on a prescribed algorithm, a specified video image from among a plurality of video images displayed on said display device, wherein said audio output control means outputs to an audio output device audio data for the video image selected by said video image selecting means.

6. A multichannel information processing device according to claim 5, wherein said video image selecting means switches to a different video image for selection whenever a prescribed length of time has passed.

7. A multichannel information processing method displaying a plurality of video images simultaneously on a computer having a display device, an input device and an audio output device, the method comprising:
   deciding display positions on said display device for video images to be displayed on a display device;
   outputting information for said plurality of video images based on the decided display positions;
   accepting cursor instructions information input from said input device;
   calculating cursor position information for displaying a cursor based on said cursor instructions information;
   generating cursor image information based on said cursor position information;
   synthesizing information for said plurality of video images and said cursor image information, generating a display image, and displaying the image on said display device;
   calculating respective distances between each of the display positions of said plurality of video images and said cursor display position, based on each center position information of the plurality of video images and center position information of the cursor and generating respective distance information; and
   deciding respective volumes of audio data for the plurality of video images displayed simultaneously on the display device based on each distance information and simultaneously outputting respective audio data to the audio output device, wherein the deciding of the respective volumes of the audio data comprises:
      setting the respective volumes of the audio data corresponding to the plurality of video image to one of multiple values in inverse proportion to said respective distances;
      synthesizing said audio data corresponding to said plurality of video images, using said respective volumes;
      outputting said synthesized audio data to the audio output device.

8. A multichannel information processing method according to claim 7, further comprising:
   generating x-axis direction information relating to directions of the display positions of the video images as seen from the cursor display position based upon an x-coordinate of central coordinates of the center position information of the video images and an x-coordinate of central coordinates of the center position information of the displayed cursor, and
   outputting to two speakers based on said x-axis direction information, so that the audio data for said plurality of video images is positioned in a sound space of the audio output device in accordance with said distance information and said x-axis direction information.

9. A multichannel information processing method according to claim 7, further comprising:
   voice-recognizing words included in the audio data for said plurality of video images, and
   converting the voice-recognized words into character data and displaying the same on said display device.

10. A multichannel information processing method according to claim 9, comprising:
   connecting to the Internet;
   searching for related web sites on the Internet, using a voice-recognized word as a keyword; and
   displaying on said display device a found related web site.

11. A multichannel information processing method according to claim 7, further comprising:
   selecting with a prescribed algorithm a specified video image from among said plurality of video images displayed on said display device, and
   outputting to said audio output device the audio data for the selected video image.

12. A computer-readable recording medium storing a program controlling a computer having a display device, an input device and an audio output device to execute a multichannel information processing for displaying a plurality of video images simultaneously on the display device, according to operations comprising:
   deciding display positions on the display device for said video images to be displayed;
   outputting information for said plurality of video images based on the decided display positions;
   accepting cursor instructions information input from said input device;
   calculating cursor position information for displaying a cursor based on said cursor instructions information;
   generating cursor image information based on said cursor position information;
   synthesizing information for said plurality of video images and cursor image information, generating a display image, and displaying the display image on said display device;
   calculating respective distances between each of the display positions of said plurality of video images and the display position of said cursor based on each center position information of the plurality of video images and center position information of the cursor and generating respective distance information; and
   deciding respective volumes of audio data for said plurality of video images displayed simultaneously on the display device based on each distance information and simultaneously outputting respective audio data to the audio output device, wherein the deciding of the respective volumes of the audio data comprises:
      setting the respective volumes of said audio data corresponding to the plurality of video images to one of multiple values in inverse proportion to said respective distances;
      synthesizing said audio data corresponding to said plurality of video images, using said respective volumes; and
      outputting said synthesized audio data to the audio output device.

13. A computer-readable recording medium storing a program controlling a computer having a display device, an input device and an audio output device to execute a multichannel information processing for displaying a plurality of video images simultaneously on the display device, according to operations comprising:
   deciding display positions on the display device for said video images to be displayed;
   outputting information for said plurality of video images based on the decided display positions;
   accepting cursor instructions information input from said input device;

calculating cursor position information for displaying a cursor based on said cursor instructions information;

generating cursor image information based on said cursor position information;

synthesizing information for said plurality of video images and said cursor image information, generating a display image, and displaying the display image on said display device;

calculating respective distances between each of the display positions of said plurality of video images and the display position of said cursor, based on each center position information of the plurality of video images and center position information of the cursor and generating respective distance information;

generating direction information relating to a direction of the display positions for each video image as seen from the cursor display position;

outputting to said audio output device so that the audio data corresponding to said plurality of video images is positioned at acoustic image positions in a sounds space of said audio output device in accordance with said respective distance information and said direction information; and deciding respective volumes of audio data for said plurality of video images displayed simultaneously on the display device based on each distance information and simultaneously outputting respective audio data to the audio output device by:

setting the respective volumes of said audio data corresponding to the plurality of video images to one of multiple values in inverse proportion to said respective distances;

synthesizing said audio data corresponding to said plurality of video images, using said respective volumes; and outputting said synthesized audio data to the audio output device.

14. A computer-readable recording medium storing a program controlling a computer having a display device, an input device and an audio output device to execute a multichannel information processing for displaying a plurality of video images simultaneously on the display device, according to operations comprising:

deciding display positions on the display device for said video images to be displayed;

outputting information for said plurality of video images based on the decided display positions;

accepting cursor instructions information input from said input device;

calculating cursor position information for displaying a cursor based on said cursor instructions information;

generating cursor image information based on said cursor position information;

voice-recognizing words included in audio data of said plurality of video images;

converting the voice-recognized words into character data and outputting the same;

synthesizing said plurality of video images, said cursor image information and said character information, and generating a display image and displaying the display image on said display device;

calculating respective distances between each of the display positions of said plurality of video images and the display position of said cursor, based on each center position information of the plurality of video images and center position information of the cursor and generating respective distance information; and deciding respective volumes of the audio data for said plurality of video images displayed simultaneously on the display device based on each distance information and simultaneously outputting respective audio data to the audio output device, wherein the deciding of the respective volumes of the audio data comprises:

setting the respective volumes of said audio data corresponding to the plurality of video images to one of multiple values in inverse proportion to said respective distances;

synthesizing said audio data corresponding to said plurality of video images, using said respective volumes; and outputting said synthesized audio data to the audio output device.

15. A computer-readable recording medium storing a program controlling a computer having a display device, an input device and an audio output device to execute a multichannel information processing for displaying a plurality of video images simultaneously on the display device, according to operations comprising:

deciding display positions on the display device for said video images to be displayed;

outputting information for said plurality of video images based on the decided display positions;

accepting cursor instructions information input from said input device;

calculating cursor position information for displaying a cursor based on said cursor instructions information;

generating cursor image information based on said cursor position information;

calculating respective distances between each of the display position positions of said plurality of video images and said cursor position information, based on each center position information of the plurality of video images and center position information of the cursor and generating respective distance information;

selecting a specified video image from among the plurality of video images based on said distance information and outputting audio data of the selected video image to the audio output device;

voice-recognizing words included in audio data of video images;

converting the voice-recognized words into character information and outputting the same;

synthesizing said plurality of video images, said cursor image information and said character information, and generating a display image and outputting the same to the display device; and deciding respective volumes of the audio data for said plurality of video images displayed simultaneously on the display device based on each distance information and simultaneously outputting respective audio data to the audio output device, wherein the deciding of the respective volumes of the audio data comprises:

setting the respective volumes of said audio data corresponding to the plurality of video images to one of multiple values in inverse proportion to said respective distances;

synthesizing said audio data corresponding to said plurality of video images, using said respective volumes; and outputting said synthesized audio data to the audio output device.

16. A computer-readable recording medium storing a program controlling a computer having a display device, an input device and an audio output device to execute a multichannel information processing for displaying a plurality of video images simultaneously on the display device, according to operations comprising:

deciding display positions on the display device for said video images to be displayed;

outputting information for said plurality of video images based on the decided display positions;

accepting cursor instructions information input from said input device;

calculating cursor position information for displaying a cursor based on said cursor instructions information;

generating cursor image information based on said cursor position information;

calculating respective distances between each of the display position positions of said plurality of video images and said cursor position information, based on each center position information of the plurality of video images and center position information of the cursor and generating respective distance information;

selecting a specified video image from among the plurality of video images based on said distance information and outputting audio data of the selected video image to the audio output device;

voice-recognizing words included in audio data of video images;

connecting to the Internet;

searching for related web sites on the Internet using a voice-recognized word as keywords;

synthesizing said plurality of video images, said cursor image information and said found web site, and generating a display image and display the same on said display device; and deciding respective volumes of the audio data for said plurality of video images displayed simultaneously on the display device based on each distance information and simultaneously outputting respective audio data to the audio output device, wherein the deciding of the respective volumes of the audio data comprises:

setting the respective volumes of said audio data corresponding to the plurality of video images to one of multiple values in inverse proportion to said respective distances;

synthesizing said audio data corresponding to said plurality of video images, using said respective volumes; and outputting said synthesized audio data to the audio output device.

17. A computer-readable recording medium storing a program controlling a computer having a display device, an input device and an audio output device to execute a multichannel information processing for displaying a plurality of video images simultaneously on the display device, according to operations comprising:

deciding display positions on the display device for said video images to be displayed;

outputting information for said plurality of video images based on the decided display positions;

selecting with a prescribed algorithm a specified video image from among said plurality of video images displayed on said display device;

calculating cursor position information for displaying a cursor;

calculating respective distances between each of the display positions of said plurality of video images and the display position of said cursor, based on each center position information of the plurality of video images and center position information of the cursor and generating respective distance information;

outputting audio data of the selected video image to said audio output device; and deciding respective volumes of the audio data for said plurality of video images displayed simultaneously on the display device based on each distance information and simultaneously outputting respective audio data to the audio output device wherein the deciding of the respective volumes of the audio data comprises:

setting the respective volumes of said audio data corresponding to the plurality of video images to one of multiple values in inverse proportion to said respective distances;

synthesizing said audio data corresponding to said plurality of video images, using said respective volumes; and outputting said synthesized audio data to the audio output device.

18. A apparatus having a display device, an input device and an audio output device and displaying a plurality of video images simultaneously on the display device, comprising:

a controller deciding display positions on the display device for said video images to be displayed, calculating cursor position information for displaying a cursor, calculating respective distances between each of the display positions of said plurality of video images and the display position of said cursor, based on each center position information of the plurality of video images and center position information of the cursor and generating respective distance information, and deciding respective volumes of the audio data for said plurality of video images displayed simultaneously on the display device based on each distance information and simultaneously outputting respective audio data to the audio output device, wherein the deciding of the respective volumes of the audio data comprises:

setting the respective volumes of said audio data corresponding to the plurality of video images to one of multiple values in inverse proportion to said respective distances, synthesizing said audio data corresponding to said plurality of video images, using said respective volumes; and outputting said synthesized audio data to the audio output device.

* * * * *

UNITED STATES PATENT AND TRADEMARK OFFICE
CERTIFICATE OF CORRECTION

PATENT NO.        : 7,633,487 B2
APPLICATION NO.   : 10/669508
DATED             : December 15, 2009
INVENTOR(S)       : Toshihiro Azami et al.

It is certified that error appears in the above-identified patent and that said Letters Patent is hereby corrected as shown below:

Title page, column 2, item [57] (Abstract), Line 6, before "cursor" insert --the--.

Column 15, Line 67, change "position" to --positions--.

Column 16, Line 12, change "by" to --by the--.

Column 16, Line 37, after "information" insert --generated by said distance information--.

Column 18, Line 2, change "claim 9,comprising:" to --claim 9, comprising:--.

Column 18, Line 31, after "and" insert --said--.

Column 19, Line 20, change "sounds" to --sound--.

Column 20, Line 33, after "play" delete "position".

Column 20, Line 42, change "data of" to --data of the--.

Column 21, Line 7, change "positions;" to --position;--.

Column 21, Line 15, after "play" delete "positon".

Column 21, Line 24, after "data of" insert --the plurality of--.

Column 21, Line 29, change "keywords;" to --keyword;--.

Column 21, Line 32, change "and display the same" to --and displaying the same--.

Column 21, Line 48, change "recording" to --storage--.

Column 21, Line 57, change "positions;" to --position;--.

Column 22, Line 18, change "device" to --device,--.

Column 22, Line 29, change "A" to --An--.

Column 22, Line 35, change "cursor" to --cursor display--.

Column 22, Line 55, change "volumes;" to --volumes,--.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,633,487 B2 Page 1 of 1
APPLICATION NO. : 10/669508
DATED : December 15, 2009
INVENTOR(S) : Azami et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1220 days.

Signed and Sealed this

Ninth Day of November, 2010

David J. Kappos
*Director of the United States Patent and Trademark Office*